United States Patent [19]
Tsuchiya et al.

[11] 3,734,199
[45] May 22, 1973

[54] DISK HARROW WITH DISK GANGS SPACED LONGITUDINALLY AND OVERLAPPED TRANSVERSELY TO FORM A RIDGE-FREE CENTER

[75] Inventors: William Sadayuki Tsuchiya; Thomas Burton Adams, Jr., both of Moline, Ill.

[73] Assignee: Deere & Company, Moline, Ill.

[22] Filed: Feb. 8, 1971

[21] Appl. No.: 113,456

[52] U.S. Cl. .................. 172/551, 172/587, 172/596
[51] Int. Cl. .............................................. A01b 23/04
[58] Field of Search .................... 172/551, 568, 572, 172/576, 585, 587, 582, 595, 657, 600, 705–706, 709

[56] References Cited

UNITED STATES PATENTS

| | | | |
|---|---|---|---|
| 2,797,542 | 7/1957 | Webster et al. | 172/328 |
| 3,517,751 | 6/1970 | Morkoski | 172/572 |
| 496,811 | 5/1893 | Bell | 172/587 |
| 1,026,760 | 5/1912 | Michael | 172/570 |
| 3,502,155 | 3/1970 | Kenny | 172/570 |
| 3,213,946 | 10/1965 | Carrick | 172/551 |
| 1,364,943 | 1/1921 | McAdam | 172/587 |
| 1,247,017 | 11/1917 | Sharp | 172/595 |

*Primary Examiner*—Robert E. Pulfrey
*Assistant Examiner*—C. W. Hanor
*Attorney*—H. Vincent Harsha, Harold M. Knoth, William A. Murray, John M. Nolan and John O. Hayes

[57] ABSTRACT

A disk harrow having a forwardly diverging pair of front disk gangs, the innermost disks of which are spaced longitudinally and overlapped transversely to form a ridge-free center furrow as the harrow is advanced forwardly, and a rearwardly diverging pair of rear disk gangs, the innermost disks of which are positioned adjacent to the opposite sidewalls of the center furrow formed by the front disks and spaced longitudinally to deflect soil into and thereby fill the furrow first from one side and then from the other as the harrow is advanced. The front pair of gangs are mounted on the harrow frame to yield inwardly upon striking a stump, rock, or similar obstruction, and the rear pair of gangs are mounted on the frame to yield outwardly upon striking such an obstruction.

4 Claims, 7 Drawing Figures

PATENTED MAY 22 1973 3,734,199

INVENTORS
W. S. TSUCHIYA
T. B. ADAMS Jr.

BY John O. Hayes
ATTORNEY

PATENTED MAY 22 1973 3,734,199
SHEET 2 OF 2
FIG. 3
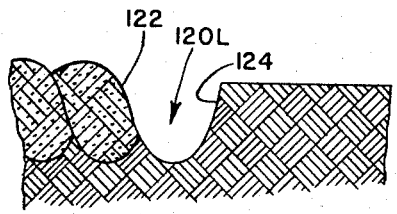
FIG. 4
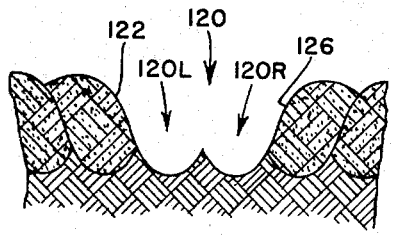
FIG. 5
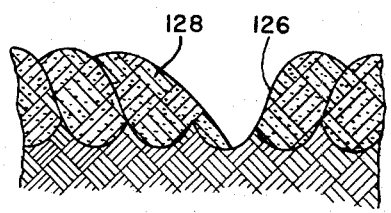
FIG. 6
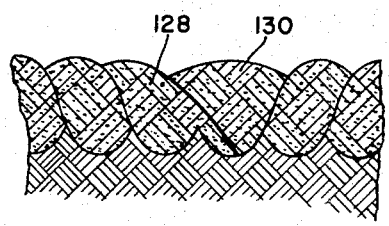
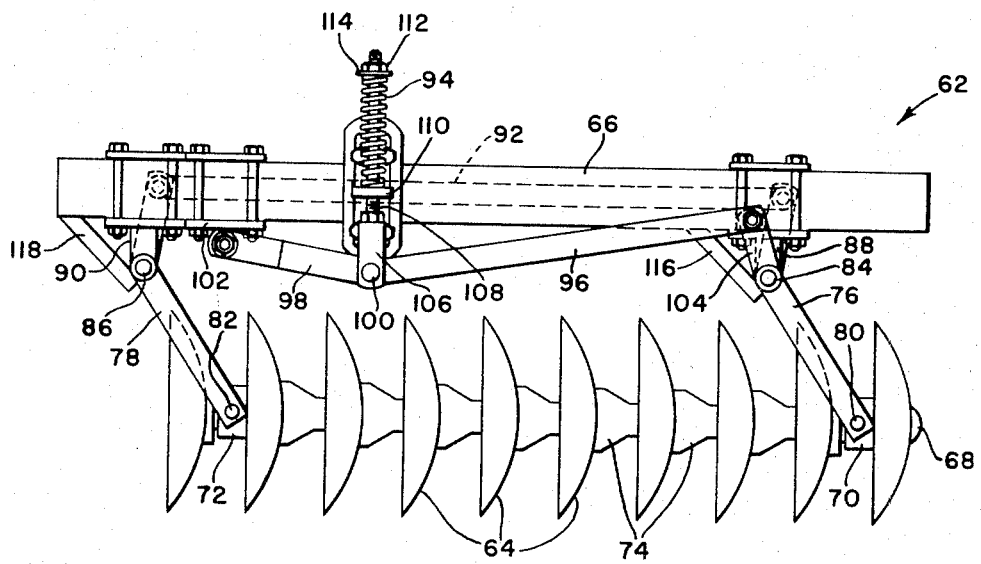
FIG. 7
INVENTORS
W. S. TSUCHIYA
T. B. ADAMS Jr.
BY John O. Hayes
ATTORNEY

DISK HARROW WITH DISK GANGS SPACED LONGITUDINALLY AND OVERLAPPED TRANSVERSELY TO FORM A RIDGE-FREE CENTER

BACKGROUND OF THE INVENTION

The present invention relates generally to disk harrows, and more particularly to a disk harrow having front and rear pairs of angled disk gangs arranged in such a manner as to produce a smooth, ridge-free soil pattern.

In accordance with conventional tandem disk harrow design, the longitudinal axes of the forward pair of disk gangs converge rearwardly and intersect on the fore-and-aft centerline of the implement, while the longitudinal axes of the rear pair of disk gangs converge forwardly and also intersect on the fore-and-aft centerline of the implement. In operation, the inwardly concave disks comprising the front gangs thus deflect soil outwardly and form a pair of center voids or furrows, while the outwardly concave disks comprising the rear gangs deflect the soil back inwardly and fill the furrows left by the front disks. Since a minimum clearance must be maintained between the innermost disks on the front pair of gangs, a ridge of untilled soil is necessarily left between the furrows formed by these disks. The problems created by the existence of such a ridge are aggravated by the action of the innermost disks on the rear pair of gangs in filling the center furrows. Since these disks are positioned directly across from each other they act to simultaneously deflect the soil forming the outer walls of the furrows inwardly, and as the soil from both sides collides it tends to form in a mound or ridge along the centerline of the harrow. The mound or ridge of soil thus resulting from the combined action of the inner disks on the front and rear gangs may cause subsequent planting problems and encourage soil erosion. Although the uncut ridge left by the front disks can be eliminated by mounting a separate cultivator or middlebreaker attachment on the center of the implement between the front and rear gangs, this increases the cost of the implement and represents only a partial solution to the problem.

SUMMARY OF THE INVENTION

According to the present invention, this problem associated with tandem disk harrows of conventional design is eliminated by arranging the gangs on the implement frame in such a manner that the innermost disks on the front and rear pairs of gangs are spaced fore-and-aft, and the innermost disks on the front pair overlap transversely. The innermost disk on the rearwardly spaced front gang is positioned to ride partially within the furrow formed by the innermost disk on the forward front gang and partially in the untilled soil forming one wall thereof. This arrangement of the front gangs serves to eliminate the ridge of untilled soil left by the front gangs on tandem harrows of conventional design. As a result of the longitudinally spaced arrangement of the rear pair of gangs, soil is deflected back into the center furrow or void first from one side thereof and then from the other, thus eliminating the collision of soil and resultant ridge formation which occurs in the operation of conventional tandem disks. The soil pattern produced by a harrow constructed in accordance with the present invention is thus smooth and ridge-free.

The longitudinally spaced relationship of the front gangs, in addition to the advantages already mentioned, permits the gangs to be mounted on the frame for relative inward movement. Such relative inward movement of the front gangs is not possible in conventional disks due to the proximity of the inner ends of the gangs. The front pair of gangs, according to the invention, are mounted on their respective gang frames to move inwardly against the biasing force of a spring upon striking an obstruction such as a rock or stump. In a like manner, the rear pair of gangs are mounted on their respective frames to move outwardly upon striking such an obstruction.

BRIEF DESCRIPTION OF THE DRAWINGS

The preferred embodiment of the invention will be described in conjunction with the accompanying drawings in which:

FIG. 3 is an enlarged cross-sectional view taken along the line 3—3 of FIG. 2;

FIG. 4 is an enlarged cross-sectional view taken along the line 4—4 of FIG. 2;

FIG. 5 is an enlarged cross-sectional view taken along the line 5—5 of FIG. 2;

FIG. 6 is an enlarged cross-sectional view taken along the line 6—6 of FIG. 2; and FIG. 7 is a fragmentary, enlarged elevation view taken along the line 7—7 of FIG. 1.

DESCRIPTION OF THE PREFERRED EMBODIMENT

Figure 1:
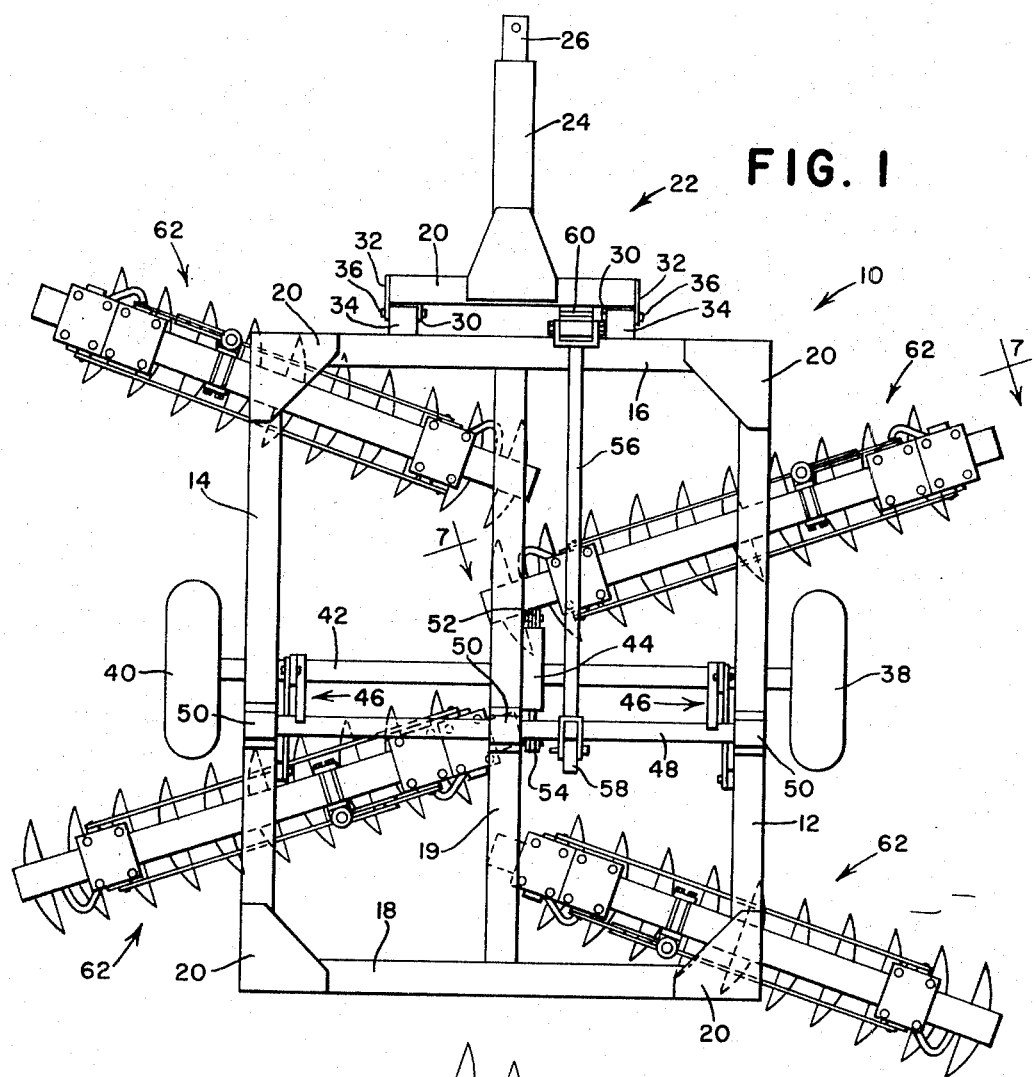
FIG. 1 is a plan view of a disk harrow constructed in accordance with the principles of the invention.

Referring first to FIG. 1, the harrow includes a generally rectangular frame structure 10 composed of right and left, longitudinally extending side rails 12 and 14, respectively, interconnected at their fore-and-aft ends by transverse cross members 16 and 18, respectively. A triangular plate member 20 reinforces each corner of the frame. The frame further includes a longitudinal member 19 extending along the centerline thereof between the cross members 16 and 18. A T-shaped hitch structure 22 is mounted on the forward side of the front cross member 16 for swinging movement about a transverse axis, the hitch including a longitudinally extending tongue member 24 provided at its forward end with a U-shaped clevis 26 for attachment to the drawbar of a tractor, and fixed at its rearward end to the center of a transverse member 28. Inner and outer straps 30 and 32, respectively, are fixed to each end of the member 28, each pair of straps extending rearwardly on either side of a bracket 34 fixed to the forward side of the frame cross member 16. A pin 36 pivotally mounts each pair of straps 30 and 32 on their adjacent bracket 34 to define the swinging axis of the hitch 32.

The frame 10 is supported by a pair of right and left ground wheels 38 and 40, respectively, rotatably mounted on the opposite ends of a transverse axle 42 outwardly of the frame side members 12 and 14, respectively. The axle 42 is moved vertically relative to the frame 10, to raise and lower the latter relative to the ground, by means of an extensible and retractable hydraulic cylinder 44. Each end of the axle 42 is connected through a conventional linkage 46 to the opposite ends of a rockshaft 48 rotatably mounted on frame members 12 and 14 in bearings 50. The cylinder 44 acts between a bracket 52 on the right side of the longitudinal center frame member 19 and a radially extending arm 54 on the underneath side of the rockshaft 48 to rotate the later and, through the medium of the linkages 46, raise and lower the wheels 38 and 40 relative to the frame 10. As the rockshaft 48 is rotated, a longitudinal link 56 interconnecting an arm 58 on the shaft 48 with the upper end of a leaf spring assembly 60 mounted on and extending upwardly from the rear side of the hitch member 28, acts to swing the hitch structure 22 about the transverse axis defined by the pins 36 and correspondingly raise and lower the clevis 26 relative to the frame, whereby the clevis is maintained at a constant height relative to the ground as the frame is raised and lowered.

Mounted on and extending along the underneath side of the frame 10 are four disk gang assemblies 62 arranged in fore-and-aft, respectively forwardly and rearwardly diverging pairs. Each gang assembly 62 comprises a plurality of dished, soil-working disks 64 mounted on a frame member 66 which, in turn, is mounted in a conventional manner on the longitudinal frame members 12, 14, and 19. It will be noted that the disk gang assemblies 62 comprising each transverse pair are essentially mirror images of one another, and that the assemblies 62 comprising each fore-and-aft pair are identical, though turned end-for-end. Thus, a detailed description of one of the assemblies, shown in FIG. 7, will analogously apply to the others as well.

Referring to FIG. 7, the disks 64 are mounted on a rod 68 which, in turn, is rotatably supported at each of its ends in bearings 70 and 72. The disks are maintained at equal intervals on the rod 68 by means of spools or spacers 74. A pair of parallel support arms 76 and 78 are pivotally connected at their lower ends to the bearings 70 and 72, at 80 and 82, respectively, and at their upper ends, at 84 and 86, respectively, to brackets 88 and 90 bolted to the underneath side of the gang frame member 66. The disk gang is thus free to swing upwardly and longitudinally relative to its axis. The arms 76 and 78 are interconnected by a link 92 extending along and parallel to one side of the member 66, in such a manner that the arms 76 and 78 are maintained in parallel relation and the disk gang is maintained in parallel relation with the ground.

The gang of disks 64 is biased longitudinally by means of a coil spring 94 acting through a pair of links 96 and 98. The links are pivotally interconnected at 100 and extend between a pivot bracket 102 bolted to one end of the frame 66, and an arm 104 forming a continuation of the support arm 76. A downwardly opening U-shaped member 106 is pivoted at the point of interconnection of the links 96 and 98 and includes as an integral part thereof a rod 108 extending vertically from its bight portion. The rod 108 extends through a bracket 110 mounted on the frame 66 and receives the coil spring 94 on its upper end portion. The upper end of the rod 108 is threaded to receive a nut 112 which, in conjunction with a washer 114, serves to retain the spring on the rod and adjust the compressive force therein. It will be apparent from the structure described that the force exerted by the spring 94 tends to bring the links 96 and 98 into alignment, which in turn urges the arm 76, and thus the arm 78, in the clockwise direction as viewed in FIG. 7. Each of the arms 76 and 78 is provided with a stop member 116 and 118, respectively, which engages the underneath side of the frame member 66 to limit the movement of the arms and thus the disk gang. As will be apparent from FIG. 1, the disk gangs on the front pair of gang assemblies 62 are biased outwardly against their stops and are yieldable inwardly upon striking an obstruction, while the disk gangs on the rear pairs of assemblies 62 are biased inwardly against their stops and are yieldable outwardly. The position of the nut 112 on the upper end of the rod 108 may be altered to adjust the preload on the spring 94, and thus the amount of force necessary to move the gang from its normal stop position.

Figure 2:
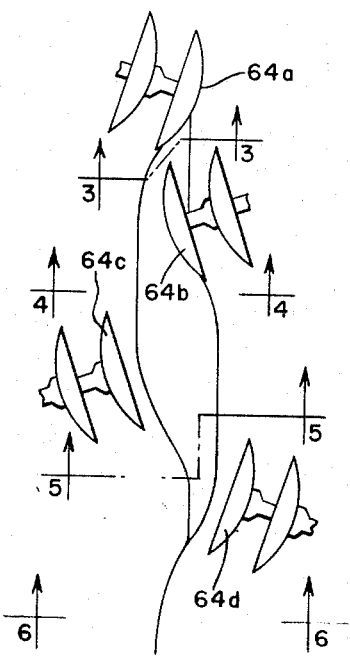
FIG. 2 is a fragmentary view of the harrow illustrating the positional relationship of the innermost disks on the front and rear pairs of disk gangs, and their action on the soil as the harrow is advanced forwardly.

Reference is now made to FIG. 2 which illustrates the relationship between the innermost disks on the various gang assemblies 62, and FIGS. 3 through 6 which, in conjunction with FIG. 2, illustrate the action of these disks on the soil as the implement is advanced forwardly therethrough. It will be noted from FIG. 2 that the innermost disk on the left front gang, designated 64a, includes a rear edge normally disposed forwardly of the front edge of the innermost disk 64b on the right front gang. When the left front gang moves transversely inwardly upon striking an obstruction, the disk 64a thereon is thus free to move inwardly past the front edge of the disk 64b on the right front gang. Similarly, when the right front gang moves transversely inwardly upon striking an obstruction, the disk 64b thereon is free to move inwardly past the rear edge of the disk 64a on the left front gang. The innermost disk 64a on the left front gang is operable, as the implement is advanced forwardly, to deflect soil toward the left side of the harrow and thereby form a furrow or void, designated 120L in FIG. 3, having a left wall 122 composed of tilled soil and a right wall 124 composed of untilled soil. The innermost disk 64b on the right front gang, as shown in FIG. 2, is positioned rearwardly of and transversely overlaps the disk 64a. As the implement is advanced forwardly, the disk 64b thus rides partially within the furrow 120L formed by the disk 64a and partially within the untilled soil forming the right wall 124 thereof, and is operable to deflect the soil forming the wall 124 toward the right of the harrow, thereby forming a second furrow or void designated 120R. As illustrated in FIG. 4, the two furrows 120L and 120R overlap and combine to form a larger furrow 120 having left and right walls 122 and 126, respectively, both walls being composed of tilled soil. The innermost disks on the left and right rear gangs, 64c and 64d, respectively, cooperate to fill the furrow 120 formed by the disks 64a and 64b. The disk 64c on the left rear gang is positioned rearwardly and laterally outwardly of the disk 64a on the left front gang, and adjacent to the left wall 122 of the furrow 120. In operation, as illustrated in FIG. 5, the disk 64c is thus operable to deflect the soil forming the wall 122 back into, and to thereby partially fill, the furrow 120. The soil deflected into the furrow 120 by the disk 64c is designated 128 in FIGS. 5 and 6. The disk 64d on the right rear gang is spaced longitudinally from the disk 64c on the left rear gang and positioned adjacent to the right wall 126 of the furrow 120. The disk 64d is thus operable to deflect the soil forming the wall 126 back into the already partially filled furrow 120 and thereby completely fill the furrow as illustrated in FIG. 6. The soil deflected into the furrow 120 by the disk 64d is designated 130 in FIG. 6. Since the furrow 120 is filled first from the left side and then from the right, the soil from the two sides does not collide as it enters the furrow, but instead flows in freely, leaving a uniform, ridge-free pattern at the rear of the harrow.

We claim:

1. A disk harrow comprising: a mobile frame having first and second sides; first and second forwardly diverging front gangs of inwardly concave soil-working disks on the first and second sides, respectively, of said frame, the innermost disk on said first front gang being operative as the harrow is advanced forwardly to deflect soil toward the first side of said frame and thereby form a furrow having laterally opposite, first and second walls of tilled and untilled soil, respectively, and a disk on the inner portion of said second front gang having a front edge spaced rearwardly of the rear edge of the innermost disk on said first front gang, said disk on the inner portion of said second front gang being normally disposed partially in the furrow and partially in the untilled soil forming the second wall thereof as the harrow is advanced forwardly, said last mentioned disk being operative to deflect the untilled soil forming the second wall toward the second side of said frame and thereby widen said furrow; means yieldably mounting said front gangs on said frame for transverse inward movement relative to each other in response to an abnormal side load imposed on said front gangs, the rear edge of the innermost disk on said first front gang being movable inwardly from its normal position past the front edge of the disk on the inner portion of said second front gang, and the front edge of the disk on the inner portion of said second front gang being movable inwardly from its normal position past the rear edge of the innermost disk on said first front gang; and first and second rearwardly diverging rear gangs of outwardly concave soil-working disks mounted on the first and second sides, respectively, of said frame, the innermost disk on said first rear gang being disposed rearwardly and laterally outwardly of the innermost disk on said first front gang and adjacent to and outwardly of the first wall of said furrow, said innermost disk on said first rear gang being operative as the harrow is advanced forwardly to deflect the soil forming said first wall inwardly into the furrow, and the innermost disk on said second rear gang being disposed rearwardly of the innermost disk on said first rear gang and adjacent to and outwardly of the second wall of said furrow, said innermost disk on said second rear gang being operative as the harrow is advanced forwardly to deflect the soil forming said second wall inwardly into the furrow.

2. The invention defined in claim 1 wherein said means yieldably mounting said front gangs on said frame comprises support means mounting said gangs on said frame for transverse inward and outward movement; stop means acting between said support means and said frame to limit the extent of outward movement of said gangs; and resilient means acting between said support means and said frame to bias said gangs transversely outwardly.

3. The invention defined in claim 1 including means yieldably mounting said rear gangs on said frame for transverse outward movement relative to each other in response to an abnormal side load imposed on said rear gangs.

4. The invention defined in claim 3 wherein said means yieldably mounting said rear gangs on said frame comprises support means mounting said gangs on said frame for transverse inward and outward movement; stop means acting between said support means and said frame to limit the extent of inward movement of said gangs; and resilient means acting between said support means and said frame to bias said gangs transversely inwardly.

* * * * *